Patented May 12, 1953

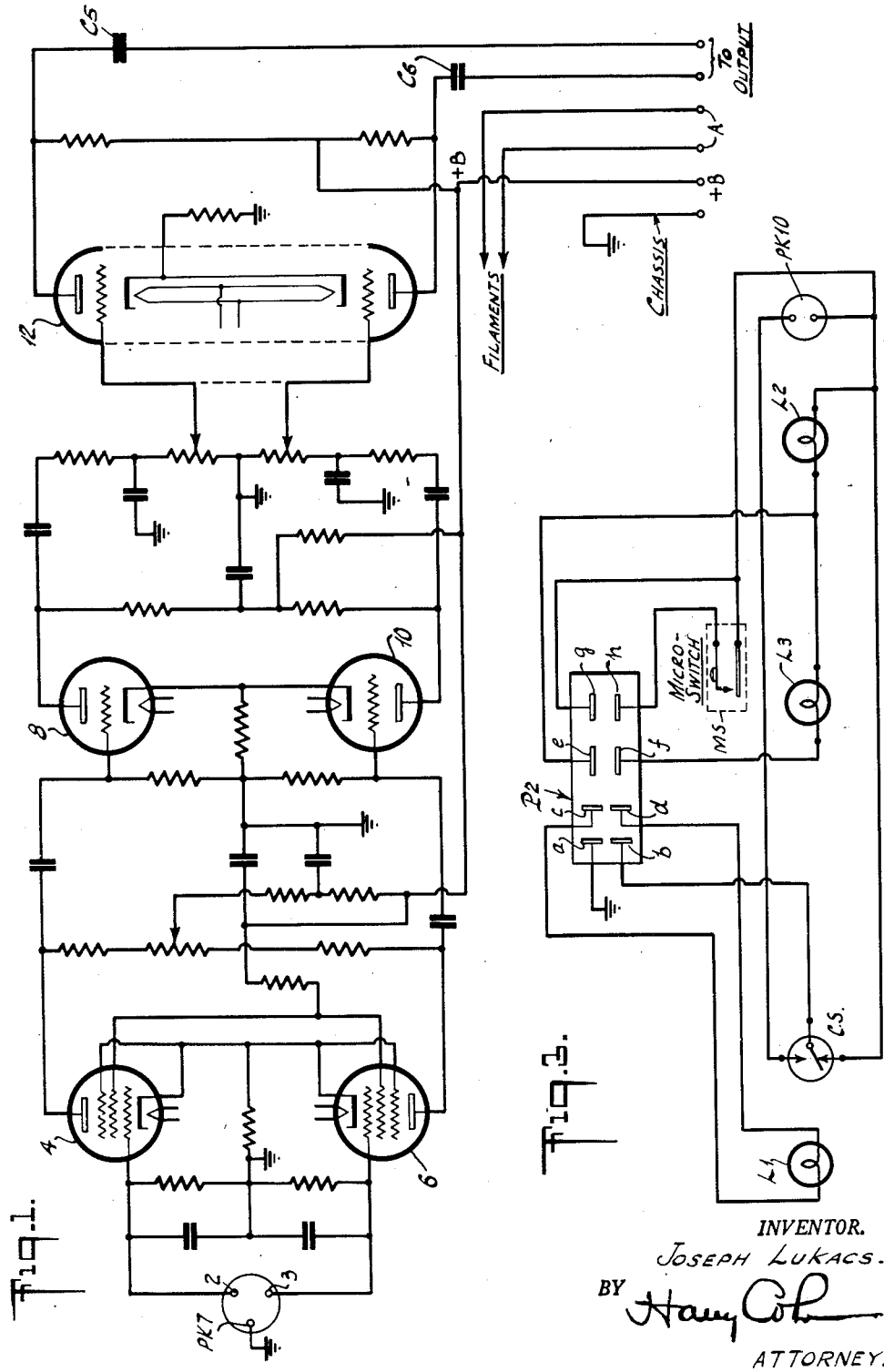

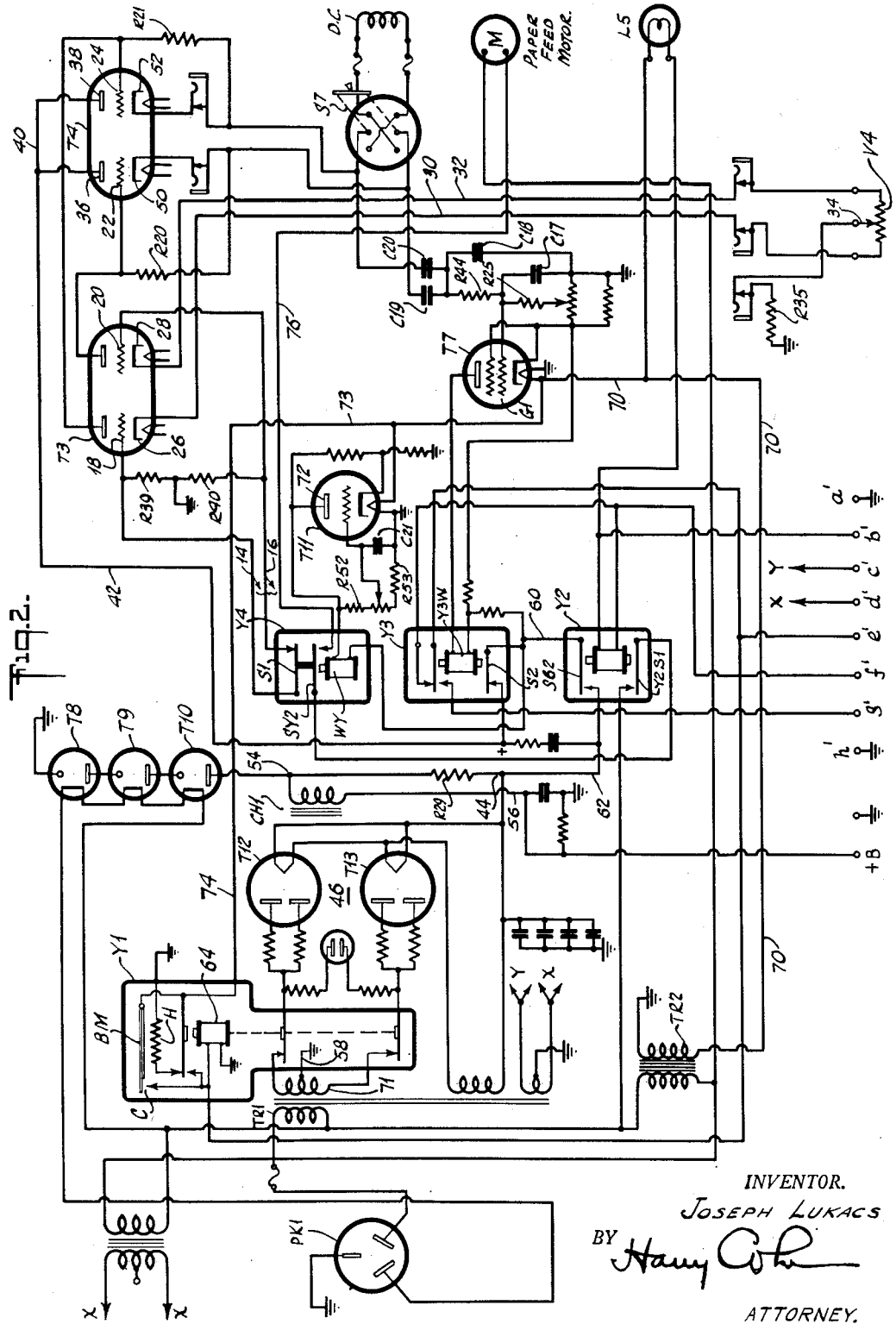

2,638,401

UNITED STATES PATENT OFFICE 2,638,401

ELECTROCARDIOGRAPH

Joseph Lukacs, Astoria, N. Y., assignor, by mesne assignments, to Technicon Cardiograph Corporation, New York, N. Y.

Application January 29, 1947, Serial No. 725,026

32 Claims. (Cl. 346—33)

My present invention relates to electro-cardiographs and is particularly directed to improved electrical and electronic circuits therefor.

Electro-cardiograph systems, to which this invention is particularly directed, make use of small voltages arising across different parts of the body. These voltages, which bear a definite relation to a beating of the heart, may be taken from across the right arm and left leg, or across other different parts of the body. They are amplified and applied to some form of recording devices whereby the recorded pulses properly interpreted, will give an indication of the heart condition of the patient.

In certain types of apparatus the amplified pulses are applied to a driving coil which operates a recording pen or stylus. Since the driving coil is of relatively low impedance much difficulty has been encountered in coupling the same to the high impedance plate circuits of vacuum tubes. Heretofore, for this purpose stepdown transformers have been used, but these, as is known to those skilled in the art, have many disadvantages.

It is one object of my invention to provide an improved circuit arrangement for driving the low impedance coil of the recording system of an electro-cardiograph without the necessity of stepdown transformers or similar impedance matching devices. In carrying this object into effect I connect the driving coil between the cathodes of a pair of electron discharge systems. The grids or control electrodes of the systems are fed with control potentials or amplified electrical replicas of the heart beats or other body voltages. The plates or anodes of the systems are supplied with suitable positive potential.

Another object of the invention is to provide a power amplifier which is of such nature as to be of comparatively small size and of low weight so that the electro-cardiograph may be easily transportable.

It is further desirable in apparatus of this sort to provide for centering of the driving coil. In accordance with my invention an improved centering circuit is provided. My improved centering circuit makes use of a pair of electron discharge systems so connected to the systems whose cathodes are connected to the driving coil or load circuit, that adjustment of the position of the coil is easily made by controlling the relative current flow through the auxiliary tubes.

In a preferred embodiment of my invention I prefer to use a voltage amplifier for the feeble body voltages and a power amplifier for amplifying the output of the voltage amplifier. A low frequency amplifier, such as a resistance-capacity coupled voltage amplifier has a tendency to be unstable until all the capacities accumulate a charge which is equivalent to the average signal, and since the capacities are relatively large and since the resistances which supply voltage to the capacitors and tubes are also large, considerable time is required for the circuit to stabilize. This objection is eliminated in accordance with a further object of the present invention. Briefly this is accomplished by short circuiting the output of the voltage amplifier for a predetermined period of time. A delay circuit making use of an electron discharge device is provided which goes into operation after the lapse of a period of time in order to automatically remove the short circuit. This, as will be explained more fully later, takes place after filaments or cathodes have been brought to proper operating temperature and after plate or anode voltage has been applied to all discharge systems.

Also, a further object of my invention is to provide instrumentalities for automatically cutting off all current flow through the coil of the recording unit should excessive peaks of voltage, due for example to stray voltages, be applied thereto. In carrying out this aspect of my invention I make use of a thyratron or gaseous discharge tube circuit. A property of such tubes is that they may be brought to current conducting condition by the application of a suitable grid or control potential voltage, but thereafter current flow through the tube cannot be stopped by changing grid voltage, but can be stopped by removal of plate voltage. In accordance with my invention a thyratron is fired or tripped or caused to be conducting by the application of a voltage applied to the grid, which voltage is derived from a circuit associated with the cardiograph driving coil and which voltage is representative of an undesired voltage peak. Current flow through the anode circuit of the thyratron thereupon operates to remove plate voltage from the driving tubes of the cardiograph coil. Provision is made so that thereafter the complete starting up cycle must be followed before the system can be put back into operation.

Other objects, features and advantages of my system will be apparent as the more detailed description thereof proceeds. The latter will be given with the aid of the accompanying illustrative drawings wherein Fig. 1 is a circuit diagram of a preferred form of voltage amplifier for my improved electro-cardiograph system; Fig. 2 is a wiring diagram of the power amplifier stages of my electro-cardiograph system, its delay circuit for permitting the voltage amplifier to be brought up to a stable operating condition before amplified pulses are fed to the power amplifier and, among other things, a control circuit for removing plate voltage when excessive electrical pulses are applied to the driving coil of the electro-cardiograph and Fig. 3 is a wiring diagram of a supplementary circuit used in conjunction with the circuit of Fig. 2.

Figure 1 shows a three-stage resistance-condenser coupled voltage amplifier for amplifying feeble body currents to a level high enough to actuate the power amplifier tubes feeding the driving coil of the electro-cardiograph system. As shown in Figure 1, biological voltages derived from electrodes (not shown) connected to different parts of the body such as the left leg and right arm or left arm and right leg, or other different parts of the body in accordance with known principles of electro-cardiography, are applied to the input terminals 2, 3 of the plug PK1. As will be evident to those skilled in the art the voltages applied at the terminals 2, 3 are amplified by the three stage push-pull resistance condenser coupled amplifier. The first stage of the amplifier makes use of two tubes 4, 6 of the 6SJ7 type, the second stage makes use of two tubes 8, 10 of the 6SF5 type and the third stage comprising tube 12 which preferably is a 6SN7G dual triode. The output of the voltage amplifier is fed through condensers C5 and C6 to the input terminals 14, 16 connected to grids or control electrodes 18, 20 of the first tube of the power amplifier.

The power amplifier makes use of two tubes T3 and T4 each preferably of the 6AS7 type. As will be explained later switch S1 of the relay Y4 opens some time after the voltage amplifier of Figure 1 has been energized a sufficiently long period of time so as to reach a "steady state" operating condition. When this occurs the short circuit on the sides of coupling condensers C5, C6 electrically remote from the voltage amplifier is removed and the pulsating body potentials are then applied in opposite phase or push-pull relation through the condensers to the grids 18, 20 of the power amplifier tube T3.

The plates or anodes of power amplifier tube T3 are directly connected to the grids 22, 24 of the output tube T4. The cathodes of tube T4 are connected through reversing switch S7 to the low impedance driving coil DC of the electro-cardiograph. This coil is mounted within a strong unidirectional magnetic field and will move in opposite directions from the indicated centered position in response to variations in the amplified body voltages, thereby serving to drive the recording pen or stylus of the electrically operated electro-cardiograph recorder disclosed and claimed in my application executed December 3, 1946, Serial No. 714,084, filed December 4, 1946, now Patent Number 2,590,554, issued March 25, 1952, said application being the only patent application executed by me on said date, namely on December 3, 1946.

The grids 22, 24 of the tube T4 are connected to the cathodes of the two electron discharge systems within tube T4 by way of resistors R20 and R21. The cathodes as shown are of the indirectly heated type.

The grids 18, 20 of the electron discharge system within tube T3 are connected to their cathodes by way of resistors R39 and R40 the midpoint of which is grounded as shown.

The leads 30, 32 to the cathodes 26, 28 of the tube T3 are connected to a centering potentiometer V4 for the stylus, which is operated by the coil DC as described in my above-mentioned application. An adjustable point 34 intermediate the ends of potentiometer V4 is connected to ground through resistor R35. By adjustment of the position of point 34 along V4, the position of the coil DC within its magnetic field may be controlled.

The plates or anodes 36, 38 of the electron discharge systems within tube T4 are connected together as indicated at 40 and through lead 42 to a point 44 of positive potential in a suitable anode potential source provided by the rectifier system 46. It will be noted that the electron discharge systems of tubes T3 and T4, are connected in a bridge circuit as shown.

It should be noted by virtue of the arrangement described hereinabove that although the coil DC is of relatively low impedance it is operated efficiently, without step down transformers, by virtue of its connection to and between the cathodes 50, 52 in the bridge circuit of the electron discharge systems of tubes T3 and T4.

Power is supplied to the system through the plug PK1. The 60 cycle commercial power is then applied through transformer TR1 to the rectifier system 46 for supplying anode or "B" potential. This rectified potential is fed through point 44 and resistor R29 to the voltage regulator tubes T8, T9 and T10. The regulated voltage at point 54 is fed through choke CH1 to the lead 56 for the anode voltage for the pre-amplifier or voltage amplifier of Figure 1. This positive voltage is also supplied to the anodes of the power amplifier tube or electron discharge system T4. The negative terminal of the anode supply, that is, the mid-point of the high voltage secondary of transformer TR1 is grounded at 58 as shown.

The anode voltage for the tube or electron discharge system T4 may be traced to rectifier system 46 by way of connection 40, lead 42, switch S2 of relay Y3, lead 60, switch S62 of relay Y2 and lead 62 to the positive point 44 connected with the rectifier system 46.

Relay Y1 is a time delay relay which when power is turned on permits the tubes to heat up for about a minute before plate voltage is generated. Thus, relay Y1 makes use of a bi-metallic strip BM which is heated by the heater H to close contact C after the lapse of about one minute. Closure of contact C causes the energization of coil 64 thereby enabling the application of voltages induced in the high-voltage secondary to the plates of the voltage rectifier 46. Energization of coil 64 is produced by the closing of contact C by virtue of the voltage induced in the secondary of transformer TR2 which is fed through contact C by way of leads 70, 73 and 74.

As indicated hereinbefore, switch S1 is opened after a long enough period of time has elapsed to enable the voltage amplifier of Figure 1 to become stabilized. This delayed opening is effected by the action of tube T11 which is of the 6C5 type. Tube T11 is normally non-conductive. When rectifier 46, comprising rectifiers T12 and T13, is excited by connection of the high voltage secondary 71 of transformer TR1 thereto, positive plate potential is applied to plate 72 of delay tube T11. Condenser C21 then charges at a rate determined by resistor R52 and when the charge reaches a sufficiently high value it causes T11 to pass plate currents, since the charge will then apply a voltage to the grid of tube T11 to make it conductive. When this occurs, current flowing through the winding WY of relay Y4 will open switch S1 allowing the output of the voltage amplifier of Figure 1 to be applied to the grids of tube T3. Simultaneously the switch SY2 of relay Y4 will close closing the A. C. circuit including lead 76 thereby energizing the paper or record feed motor M for the cardiograph. Relay Y2 is a main relay for starting and stopping the paper feed motor and also serves to place plate voltage on the plates of the output tubes. The switch contacts of switch S62 of relay Y2 are in series with the plate voltage contacts of switch S2 of relay Y3. Also, it is to be noted that the A. C. contacts of switch Y2 S1 of relay Y2 are in series with the A. C. contacts of switch SY2 of relay Y4.

Relay Y3 is an overload relay which is energized by a thyratron gaseous tube T7 of the 2050 type. Excessive signals or voltages fed to coil DC are applied to the grid G1 through condensers C19, C20 and the resistance capacity network R44, R25, C17 and C18. Such excessive voltages as will cause tube T7 to break down and conduct, will energize coil Y3W of relay Y3 opening contacts of switch S2 thereby removing plate voltage from tube T4.

A rotary selector switch (not shown) may be used to select the different patient leads for connection to terminals 2, 3 of plug PK7 (Figure 1), and also for introducing a standardizing voltage alternately up and then down.

More particularly, if desired a standardizing voltage of about one millivolt may be introduced into the cardiograph. This is preferably done at intervals by a micro switch mounted on the side of the above-mentioned recording unit. This switch may be actuated by the three-pointed cam, as disclosed in my above-mentioned application serving to turn the battery of standardizing voltage on and off. The rotary selector switch should be of very good quality so as to insure minimum leakage. A micro switch MS (Fig. 3) installed on the lead or rotary selector switch assembly is actuated every time the lead switch is moved causing relay Y2 in the power unit to drop out momentarily while the lead switch is in between patient positions. The purpose of this is to avoid any possible surges that may cause the pen to deflect forcibly against the paper guide of the recording unit shown in my above-identified application. When Y2 acts the time delay circuit is recycled and there is a stabilizing delay of about five to ten seconds before the chart resumes its movement.

The terminals $a, b, c, d, e, f, g$ and $h$, of the connector plug P2 in the supplementary circuit shown in Fig. 3 are connected to the socket terminals $a', b', c', d', e', f', g'$ and $h'$, respectively (Fig. 2). Said supplementary circuit includes the double throw switch CS for controlling the circuit of the coil of main relay Y2 through relay Y4, for starting and stopping the paper feed motor M, and for applying plate voltage on the output tubes. Said double throw switch is also in the circuit of a remote control plug PK10 (Fig. 3) which may be connected to a remote-control switch (not shown) which may be located near the patient. Said supplementary circuit also includes the above-mentioned micro-switch MS, and the signal lamps L1, L2, and L3 which are, respectively, a main pilot light, a recorder pilot light, and a signal light which indicates an abnormal condition in the input to the voltage amplifier (Fig. 1). The recorder pilot light L2 (Fig. 3) is mounted on the cabinet or frame (not shown) which carries the voltage and power amplifiers and which may be remote from the recorder unit which includes the pilot light L5 shown in Fig. 2.

What is claimed is:

1. Apparatus for use in an electro-cardiograph having a paper-feed and a recording stylus, an electric motor for operating the paper feed, a voltage amplifier, a power amplifier operable in response to signals from said voltage amplifier, a driving coil operable by the current supplied thereto from said power amplifier for actuating the recording stylus, and means for delaying the operation of said paper-feed motor until the operation of said voltage amplifier is stabilized, said motor being normally unenergized, and said delay means comprising a circuit in a normally non-conductive state, and means for rendering said circuit conductive after a predetermined time-delay whereby to energize said motor.

2. Apparatus for use in an electro-cardiograph having a paper-feed and a recording stylus, an electric motor for operating the paper feed, a voltage amplifier, a power amplifier operable in response to signals from said voltage amplifier, a driving coil operable by the current supplied thereto from said power amplifier for actuating the recording stylus, and means for preventing operation of said power amplifier for energizing said driving coil until the operation of said voltage amplifier is stabilized, said means comprising short circuit means between said amplifiers, and delay means comprising a circuit in a normally non-conductive state, and means for rendering said circuit conductive after a predetermined time-delay whereby said short circuit means is removed.

3. Apparatus for use in an electro-cardiograph having a paper-feed and a recording stylus, an electric motor for operating the paper feed, a voltage amplifier, a power amplifier operable in response to signals from said voltage amplifier, a driving coil operable by the current supplied thereto from said power amplifier for actuating the recording stylus, means for delaying the operation of said paper-feed motor until the operation of said voltage amplifier is stabilized, and means for preventing operation of said power amplifier for energizing said driving coil until the operation of said voltage amplifier is stabilized, said motor being normally unenergized, short circuit means being provided between said amplifiers, said delay means and said preventing means comprising a circuit in a normally non-conductive state, and means for rendering said circuit conductive after a predetermined time-delay whereby said motor is energized and said short circuit means is removed.

4. Apparatus for use in an electro-cardiograph having a recording stylus, a driving coil for operating said stylus, an electronic-discharge power amplifier for energizing said driving coil in accordance with amplified body voltages, and means responsive to the energization of said coil above a predetermined level for rendering said power amplifier inoperative with respect to said driving coil, said means comprising an electron discharge device in a normally non-conductive state, said device being rendered conductive upon said energization of said coil whereby to de-energize said power amplifier.

5. Apparatus for use in an electro-cardiograph having a recording stylus, a driving coil for operating said stylus, an electronic-discharge power amplifier for energizing said driving coil in accordance with amplified body voltages, and means responsive to the energization of said coil above a predetermined level for rendering said power amplifier inoperative with respect to said driving coil, said means comprising switching means for connecting a source of positive voltage to the plates of said power amplifier, and an electron discharge device in a normally non-conductive state, said device being rendered conductive upon said energization of said coil for opening said switching means whereby to disconnect said source of positive voltage from said plates.

6. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, a circuit for applying said biological potentials to said control grids, and separate circuits in said first mentioned circuit for connecting each of said cathodes to a point of relatively negative potential on said source, said coil being connected between said cathodes in parallel with said separate circuits whereby it is movable in either of two directions responsive to changes in differential potentials across said coil for reproducing the wave forms of said applied potentials.

7. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, a circuit for applying said biological potentials in opposite phase to said control grids, and separate circuits in said first mentioned circuit for connecting each of said cathodes to a point of relatively negative potential on said source, said coil being connected between said cathodes in parallel with said separate circuits whereby it is movable in either of two directions responsive to changes in differential potentials across said coil for reproducing the wave forms of said applied potentials.

8. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, a circuit for subjecting said control grids in opposite phase to said biological potentials with respect to said cathodes, and separate variable impedance connections in said first mentioned circuit for connecting each of said cathodes to a point of relatively low potential on said source, said coil being connected between said cathodes in parallel with said separate impedances whereby it is movable in either of two directions responsive to changes in differential potentials developed across said coil by variations in said biological potentials.

9. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, and a circuit for subjecting said control grids in opposite phase to said biological potentials with respect to said cathodes, said circuit comprising variable resistance circuits connected in a bridge network with said pair of electron discharge systems, said latter circuits connecting said cathodes to a point of relatively low potential on said source, said coil being connected between said cathodes in parallel with said latter circuits whereby it is movable in either of two directions responsive to changes in biological potentials applied to said variable resistance circuits.

10. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, and a circuit for subjecting said control grids in opposite phase to said biological potentials with respect to said cathodes, said circuit comprising a second pair of electron discharge systems connected in a bridge circuit with said first mentioned pair of electron discharge systems, each of said second discharge systems having an anode connected to a control grid of said first-mentioned systems, said second systems connecting said cathodes to a point of relatively low potential on said source, said coil being connected between said cathodes in parallel with said second systems whereby it is movable in either of two directions responsive to changes in biological potentials applied to said second pair of electron discharge systems.

11. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having a cathode, a grid and an anode, means connecting said cathodes to a point of relatively negative potential, means for subjecting said grids in push-pull relation to said biological potentials, and a second pair of electron discharge systems each having an anode, a grid and a cathode, means connecting the anodes of said second pair together and subjecting them to a positive potential with respect to the cathodes of said second pair, direct current circuits connected between the grids and cathodes of said second pair, connections from the anodes of the first pair to the grids of the second pair, said coil being connected between the cathodes of said second pair whereby it is movable in either of two directions responsive to changes in the biological potentials applied in push-pull relation to the grids of said first pair of electron discharge systems.

12. In electrical apparatus adapted for use in electro-cardiograph systems wherein a low impedance electromagnetic coil is mounted in a unidirectional magnetic field for movement in opposite directions from a centered position for driving the marking element of a recorder in response to the variations in direction and magnitude of applied biological impulse voltages, the combination with said coil of a pair of impulse voltage amplifiers each having an anode, a cathode and a grid, a circuit for applying said biological impulse voltages to said grids in relative phase opposition, a resistance connected between said cathodes, a variable connection from said resistance to a point of relatively negative potential on a potential source, a pair of impulse power amplifiers each having an anode, a cathode and a grid, direct, low impedance connections from the anodes of said impulse voltage amplifiers to the grids of said impulse power amplifiers, resistors connected between the grids and cathodes of said impulse power amplifiers, said coil being connected between the cathodes of said impulse power amplifiers whereby it is movable in opposite directions from said centered position in response to variations in the biological impulse voltages, and means for connecting the anodes of said power impulse amplifiers directly together and to a point of relatively positive potential on said source.

13. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, a circuit for subjecting said control grids in opposite phase to said biological potentials with respect to said cathodes, said circuit comprising variable resistance circuits connected in a bridge network with said pair of electron discharge systems, said latter circuits connecting said cathodes to a point of relatively low potential on said source, said coil being connected between said cathodes whereby it is movable in either of two directions responsive to changes in biological potentials applied to said variable resistance circuits, and a relay responsive to excessive current through the coil to remove said positive potential from the anodes of said electron discharge systems.

14. In electrical apparatus adapted for use in electro-cardiograph system wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pair of electron discharge systems each having an anode, a control grid, and a cathode, a source of anode potential, said anodes being together connected to a point of positive potential on said source, a circuit for subjecting said control grids in opposite phase to said biological potentials with respect to said cathodes, said circuit comprising variable resistance circuits connected in a bridge network with said pair of electron discharge systems, said latter circuits connecting said cathodes to a point of relatively low potential on said source, said coil being connected between said cathodes whereby it is movable in either of two directions responsive to changes in biological potentials applied to said variable resistance circuits, and a gaseous tube circuit responsive to excessive current through the coil to remove said positive potential from the anodes of said electron discharge systems.

15. In electrical apparatus adapted for use in electro-cardiograph systems wherein a low impedance electromagnetic coil is mounted in a unidirectional magnetic field for movement in opposite directions from a neutral position for driving the marking element of a recorder in response to the variations in direction and magnitude of applied biological impulse potentials, the combination with said coil of a bridge circuit comprising a pair of electron discharge impulse voltage amplifiers and a pair of electron discharge impulse power amplifiers, each of said amplifiers having a control grid, a cathode and an anode, an input circuit comprising means for applying said impulse potentials in push-pull relation to the grids of said impulse voltage amplifiers, the cathodes of said voltage amplifiers being connected to a source of reference potential, the anodes of said impulse voltage amplifiers being connected to the grids of said impulse power amplifiers, the anodes of said impulse power amplifiers being together connected to a source of anode potential, means connecting the cathodes of said impulse power amplifiers to said source of reference potential, said coil being connected between the cathodes of said impulse power amplifier to form the output circuit for said bridge whereby said coil will move in opposite directions from a no-signal position in response to the differential impulse power output of said bridge whereby said marking element will reproduce in graphic form the variations in direction and magnitude of said biological impulse voltages.

16. Apparatus for use in an electro-cardiograph having a recording stylus, a driving coil for operating said stylus, an electronic-discharge power amplifier for energizing said driving coil in accordance with amplified body voltages, and means responsive to the energization of said coil above a predetermined level for rendering said power amplifier inoperative with respect to said driving coil, said means comprising switching means for connecting a source of positive voltage to the plates of said power amplifier, and gaseous discharge means for opening said switching means to disconnect said source of positive voltage from said plates, said discharge means being rendered conductive upon the energization of said coil above said predetermined level.

17. In electro-cardiograph apparatus, a pre-amplifier, a power amplifier for receiving the output of said pre-amplifier, parallel condenser means coupling said pre-amplifier to said power amplifier, and means for preventing the passage of signals through said apparatus until said pre-amplifier has been brought from an unenergized condition to a relatively steady state operating condition, said means comprising short circuit means across the sides of said condenser means electrically remote from said pre-amplifier, and delay means for removing said short circuit means after a predetermined time-delay.

18. In electro-cardiograph apparatus, a pre-amplifier, a power amplifier for receiving the output of said pre-amplifier, condenser means coupling said pre-amplifier to said power amplifier, and means for preventing the passage of signals through said apparatus until said pre-amplifier has been brought from an unenergized condition to a relatively steady state operating condition, said means comprising short circuit means on the sides of said condenser means electrically remote from said pre-amplifier, and delay means comprising an electronic discharge system in a normally non-conductive state and means for rendering said system conductive after a predetermined time-delay whereby said short circuit means is removed.

19. In electro-cardiograph apparatus, a pre-amplifier, a power amplifier for receiving the output of said pre-amplifier, condenser means coupling said pre-amplifier to said power amplifier, and means for preventing the passage of signals through said apparatus until said pre-amplifier has been brought from an unenergized condition to a relatively steady state operating condition, said means comprising short circuit means on the sides of said condenser means electrically remote from said pre-amplifier, and delay means comprising an electronic discharge system in a normally non-conductive state provided with time-constant charging means having a predetermined time delay whereby, upon the application of a charging potential to said charging means for the period of said time delay, said discharge system is rendered conductive whereupon said short circuit is removed.

20. Apparatus for use in an electro-cardiograph comprising a power amplifier including electronic discharge tubes, an electronic-discharge rectifier for supplying positive potential to the plates of said tubes, and time-delay controlled means for connecting a source of alternating potential to said rectifier, said means comprising temperature-responsive means adapted to be heated by said alternating potential, and relay means adapted to be energized after said temperature-responsive means has been heated for a predetermined time, said relay means effecting the connection of said rectifier to said source upon said energization thereof.

21. In electro-cardiograph apparatus wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pre-amplifier system and a load amplifier system adapted to receive the output of said pre-amplifier system, said load amplifier system comprising a pair of electron discharge systems each having a cathode, a grid and an anode, means connecting said cathodes to a point of relatively negative potential, said grids being connected in push-pull relation to said pre-amplifier system, and a second pair of electron discharge systems each having an anode, a grid and a cathode, means connecting the anodes of said second pair together and subjecting them to a positive potential with respect to the cathodes of said second pair, direct current circuits connected between the grids and cathodes of said second pair, connections from the anodes of the first pair to the grids of the second pair, said coil being connected between the cathodes of said second pair whereby it is movable in either of two directions responsive to changes in the biological potentials applied in push-pull relation to the grids of said first pair of electron discharge systems, and instrumentalities for short circuiting the input to said latter grids until said pre-amplifier has been brought from an unenergized condition to a relatively steady state operating condition.

22. Apparatus for use in an electro-cardiograph having a paper-feed and a recording stylus, an electric motor for operating the paper feed, a voltage amplifier, a power amplifier operable in response to signals from said voltage amplifier and comprising a pair of electron discharge systems each having a cathode, a grid and an anode, means connecting said cathodes to a point of relatively negative potential, said grids being connected in push-pull relation to said voltage amplifier, and a second pair of electron discharge systems each having an anode, a grid and a cathode, means connecting the anodes of said second pair together and subjecting them to a positive potential with respect to the cathodes of said second pair, direct current circuits connected between the grids and cathodes of said second pair, connections from the anodes of the first pair to the grids of the second pair, a driving coil for actuating the recording stylus, said coil being connected between the cathodes of said second pair whereby it is movable in either of two directions responsive to changes in the biological potentials applied in push-pull relation to the grids of said first pair of electron discharge systems, and means for preventing operation of said power amplifier for energizing said driving coil until the operation of said voltage amplifier is stabilized.

23. Apparatus for use in an electro-cardiograph having a paper-feed and a recording stylus, an electric motor for operating the paper feed, a voltage amplifier, a power amplifier operable in response to signals from said voltage amplifier, rectifier means for supplying positive potential to said amplifiers, a driving coil operable by the current supplied thereto from said power amplifier for actuating the recording stylus, and means for preventing the taking of an electro-cardiograph recording until said amplifiers are stabilized, said latter means including temperature-responsive time-delay controlled means for connecting a source of alternating potential to said rectifier means after said amplifiers have been heated for the period of said time-delay, and means for preventing the passage of said signals from said voltage amplifier to said power amplifier for an additional period after the termination of said first period for stabilizing the operation of said voltage amplifier during said additional period.

24. In electro-cardiograph apparatus wherein a low impedance electromagnetic coil is mounted in a unidirectional magnetic field for movement in opposite directions from a neutral position for driving the marking element of a recorder in response to the variations in direction and magnitude of applied biological potentials, the combination with said coil of a pre-amplifier system and a load amplifier system adapted to receive the output of said pre-amplifier system, said load amplifier system comprising a pair of electron discharge systems each having a cathode, a grid and an anode, means connecting said cathodes to a point of relatively negative potential, said grids being connected in push-pull relation to said pre-amplifier system, and a second pair of electron discharge systems each having an anode, a grid and a cathode, means connecting the anodes of said second pair together and subjecting them to a positive potential with respect to the cathodes of said second pair, direct current circuits connected between the grids and cathodes of said second pair, connections from the anodes of the first pair to the grids of the second pair, said coil being connected between the cathodes of said second pair whereby it is movable in either of two directions responsive to changes in the biological potentials applied in push-pull relation to the grids of said first pair of electron discharge systems, rectifier means for supplying positive potential to said amplifiers, and means for preventing the taking of an electro-cardiograph recording until said amplifiers are stabilized, said latter means including temperature-responsive time-delay controlled means for connecting a source of alternating potential to said rectifier means after said amplifiers have been heated for the period of said time-delay, and means for preventing the passage of said biological potentials from said pre-amplifier to said load amplifier for an additional period after the termination of said first period for stabilizing the operation of said pre-amplifier during said additional period.

25. In electro-cardiograph apparatus a pre-amplifier system, a load amplifier system adapted to receive the output of said pre-amplifier system, and instrumentalities for short circuiting across the input electrodes to said load amplifier until said pre-amplifier has been brought from an unenergized condition to a relatively steady state operating condition, said pre-amplifier being of the resistance capacity coupled type, the output of said pre-amplifier being fed to the input electrodes of said power amplifier through a pair of blocking condensers, and the short circuit across the input electrodes of the power amplifier being applied to and removed from the sides of said blocking condensers electrically remote from said pre-amplifier.

26. In electro-cardiograph apparatus, a pre-amplifier system, a load amplifier system provided with input electrodes, coupling means interconnecting said preamplifier system and said input electrodes for applying the output of said preamplifier to said load amplifier, and means for applying a short circuit across said input electrodes, between said coupling means and said input electrodes, until said load amplifier has been brought from an unenergized condition to a relatively steady state operating condition.

27. Apparatus for use in an electro-cardiograph having a paper-feed and a recording stylus, an electric motor for operating the paper feed, a voltage amplifier, a power amplifier operable in response to signals from said voltage amplifier, a driving coil operable by the current supplied thereto from said power amplifier for actuating the recording stylus, and means for delaying the operation of said paper-feed motor until the operation of said voltage amplifier is stabilized, said motor being normally unenergized, and said delay means comprising an electron discharge system in a normally non-conductive state and means for rendering said system conductive after a predetermined time-delay whereby to energize said motor.

28. Apparatus for use in an electro-cardiograph having a paper-feed and a recording stylus, an electric motor for operating the paper feed, a voltage amplifier, a power amplifier operable in response to signals from said voltage amplifier, a driving coil operable by the current supplied thereto from said power amplifier for actuating the recording stylus, and means for preventing operation of said power amplifier for energizing said driving coil until the operation of said voltage amplifier is stabilized, said means comprising short circuit means between said amplifiers, and delay means comprising an electron discharge system in a normally non-conductive state and means for rendering said system conductive after a predetermined time-delay whereby said short circuit means is removed.

29. Apparatus for use in an electro-cardiograph having a paper-feed and a recording stylus, an electric motor for operating the paper feed, a voltage amplifier, a power amplifier operable in response to signals from said voltage amplifier, a driving coil operable by the current supplied thereto from said power amplifier for actuating the recording stylus, means for delaying the operation of said paper-feed motor until the operation of said voltage amplifier is stabilized, and means for preventing operation of said power amplifier for energizing said driving coil until the operation of said voltage amplifier is stabilized, said motor being normally unenergized, short circuit means being provided between said amplifiers, said delay means and said preventing means comprising an electron discharge system in a normally non-conductive state and means for rendering said system conductive after a predetermined time-delay whereby said motor is energized and said short circuit means is removed.

30. In electro-cardiograph apparatus, a pre-amplifier system, a load amplifier system provided with input electrodes adapted to receive the output voltage of said pre-amplifier system, and instrumentalities for short-circuiting across said input electrodes for preventing the passage of said voltage between said systems until said pre-amplifier system has been brought from an unenergized condition to a relatively steady state operating condition.

31. In electro-cardiograph apparatus, a pre-amplifier system, a load amplifier system provided with parallel input electrodes for receiving the output of said pre-amplifier system, and instrumentalities for short-circuiting across said input electrodes until said pre-amplifier system has been brought from an unenergized condition to a relatively steady state operating condition.

32. In electro-cardiograph apparatus, a pre-amplifier system, a load amplifier system, coupling means connected in parallel between the output of said pre-amplifier system and the input electrodes of said load amplifier system, and instrumentalities for short circuiting said input electrodes across said parallel coupling means until said pre-amplifier system has been brought from an unenergized condition to a relatively steady state operating condition.

JOSEPH LUKACS.

(References on following page)

References Cited in the file of this patent

UNITED STATES PATENTS

| Number | Name | Date |
|---|---|---|
| 1,573,801 | Bown | Feb. 23, 1926 |
| 1,647,711 | Nichols | Nov. 1, 1927 |
| 1,804,526 | Coxhead | May 12, 1931 |
| 1,897,556 | Graham et al. | Feb. 14, 1933 |
| 1,921,461 | Garstang | Aug. 8, 1933 |
| 1,955,352 | Wallace | Apr. 17, 1934 |
| 1,991,372 | Bowles | Feb. 19, 1935 |
| 2,017,126 | Kroger | Oct. 15, 1935 |
| 2,049,948 | Cushman et al. | Aug. 4, 1936 |
| 2,065,369 | Flyler | Dec. 22, 1936 |
| 2,147,449 | Lee | Feb. 14, 1939 |
| 2,153,172 | Buschbeck | Apr. 4, 1939 |
| 2,273,997 | Rubin | Feb. 24, 1942 |
| 2,310,342 | Artzt | Feb. 9, 1943 |
| 2,329,073 | Mitchell et al. | Sept. 7, 1943 |
| 2,369,066 | Maxwell | Feb. 6, 1945 |
| 2,386,892 | Hadfield | Oct. 16, 1945 |
| 2,424,893 | Mansford | July 29, 1947 |
| 2,428,295 | Scantlebury | Sept. 30, 1947 |
| 2,439,201 | Clark, Jr. | Apr. 6, 1948 |
| 2,502,419 | Cannon et al. | Apr. 4, 1950 |
| 2,504,699 | Kluender | Apr. 18, 1950 |

FOREIGN PATENTS

| Number | Country | Date |
|---|---|---|
| 471,549 | Great Britain | Sept. 6, 1937 |

OTHER REFERENCES

Radio's Master Catalog, published by the United Catalog Publisher's Inc., 106-110 Lafayette St., New York 13, New York, page H-89. (Copy in Div. 55.)

Ultra-High-Frequency Techniques edited by J. G. Brainerd, published by the D. Van Nostrand Co. Inc., 1942 edition, pages 221-225. (Copy in Div. 55.)